(12) United States Patent
Wei

(10) Patent No.: US 8,139,048 B2
(45) Date of Patent: Mar. 20, 2012

(54) METHOD OF RAISING RESOLUTION IN LOCATING ON A MICRO DOTMAP

(75) Inventor: Shou-Te Wei, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 805 days.

(21) Appl. No.: 12/265,696

(22) Filed: Nov. 5, 2008

(65) Prior Publication Data
US 2010/0027912 A1    Feb. 4, 2010

(30) Foreign Application Priority Data

Jul. 31, 2008   (TW) ................................ 97128978 A

(51) Int. Cl.
*G06F 3/042* (2006.01)
(52) U.S. Cl. ......... 345/176; 345/567; 382/233; 235/494
(58) Field of Classification Search .................... 345/32, 345/173–178, 567, 698, 699; 382/128, 232, 382/233, 299; 235/462.12, 462.17, 494; 358/1.8; 380/54
See application file for complete search history.

(56) References Cited

FOREIGN PATENT DOCUMENTS

JP        2002-223347    *    8/2002

* cited by examiner

*Primary Examiner* — Abbas Abdulselam
(74) *Attorney, Agent, or Firm* — Winston Hsu; Scott Margo

(57) ABSTRACT

While a plurality of encoding blocks included in a micro dotmap are used for marking coordinates and locating a frame center on a displaying medium, a resolution of locating the frame center is raised by finding a microdot having a shortest distance from the frame center respectively in two microdot sets of a header region, or by determining a distance scale between an origin of the encoding block and each of two parallel projection points of both the microdot sets corresponding to the frame center. Both the microdot sets correspond to different dimensions in representing the coordinate of the frame center. The closest one-dimensional coordinates are then combined to form a two-dimensional coordinate of the frame center. Therefore, while applying the abovementioned method on a touch screen manipulated with touches of an optical pen, movements of the frame center on the screen can be manipulated skillfully by a user.

30 Claims, 16 Drawing Sheets

METHOD OF RAISING RESOLUTION IN LOCATING ON A MICRO DOTMAP

BACKGROUND OF THE INVENTION

1. Field of the Invention

The present invention relates to a method of raising resolution, and more particularly, to a method of raising resolution while locating on a micro dotmap.

2. Description of the Prior Art

Please refer to FIG. 1, which illustrates scanning a displaying medium printed with a micro dotmap by manipulating an optical scanning device in a hand-writing manner so as to display tracks of the optical scanning device on a screen corresponding to a movement of the optical scanning device on the displaying medium. And please refer to FIG. 2, which illustrates a frame retrieved by scanning the displaying medium shown in FIG. 1 with the optical scanning device shown in FIG. 1. As shown in FIG. 1, a displaying medium 104 is printed with a micro dotmap, where microdots printed on the micro dotmap are printed with a particular encoding method. When a user holds an optical scanning device 106 to scan the micro dotmap printed on the displaying medium 104, a frame 120 scanned by the optical scanning device 106 on the displaying medium 104 is transmitted to a screen 102 so as to display a location, which is of the held optical scanning device 106 on the displaying medium 104, on the screen 102. As shown in FIG. 2, the frame 120 scanned in FIG. 1 covers a plurality of encoding blocks 122 arranged as a matrix. Each encoding block 122 is printed with a plurality of microdots 128 arranged according to a predetermined rule, and is separated into a header region 124 and a data region 126. The header region 124 is used for having an encoding block 122 having said header region 124 be recognizable, therefore, as shown in FIG. 2, a combination or a permutation of the plurality of microdots 128 comprised by the header region 124 of each encoding block 122 is the same. The plurality of microdots 128 comprised by each data region 126 are encoded with a particular encoding method so as to indicate a coordinate of an encoding block 122 having said data region 126 on the displaying medium 104, where the encoding method is substantially implemented on the combination or the permutation about whether each of the plurality of microdots 128 of each data region 126 is physically printed. As shown in FIG. 2, each encoding block 122 exclusively occupies one particular among the coordinates [x, y], [x+1,y], [x, y+1], and [x+1, y+1], each of which may be retrieved by performing a decoding procedure corresponding to the abovementioned encoding method on the plurality of microdots 128 of the data region 126 of each encoding block 122. In other words, each coordinate on the displaying medium 104 is indicated by taking a size of each the encoding block 122 as a unit. When the optical scanning device 106 scans the frame 120, a domain of each scanned encoding block 122 is first recognized according to a header region 124 of each the scanned encoding block 122, then a plurality of microdots 128 in a data region 126 of each the scanned encoding block 122 are decoded so as to determine a coordinate of each the scanned encoding block 122 on the displaying medium 104.

Methods mentioned in FIG. 1 and FIG. 2 are primarily applied on devices such as a Braille plate. A user may hold the optical scanning device 106 to scan and move on the displaying medium 104 so as to correspondingly operate on the screen 102, or to have the screen 102 to serve as a whiteboard by directly displaying movements of the held optical scanning device 106 on the screen 102. The displaying medium 104 is a paper printed with a micro dotmap or a printable medium capable of being printed with the micro dotmap. The optical scanning device 106 may also be a conventional scanning device capable of recognizing microdots on the micro dotmap. When the user holds the optical scanning device 106, the scanned frame 120 is directly transmitted to a processing unit included by the screen 102 or the optical scanning device 106. After the processing unit performs the abovementioned recognition and decoding procedure on the frame 120, a current location of the optical scanning device 106 on the displaying medium 104 is also displayed on the frame 120 displayed by the screen 102. After a short while, when the user holds the optical scanning device 106 to move and scan on the displaying medium 104, another frame 120 is fetched and is also processed by the processing unit of the screen 102 to be recognized and decoded.

In certain applications in the prior art, the frame 120 is fetched by taking the frame center 210 shown in FIG. 2 as a datum point so as to define a range of the moving frame 120 on the micro dotmap or the displaying medium. In other words, the range of the frame 120 is synchronously moved according to the movement of the frame center 210. Note that the frame center 210 may be invisible for an observer. When the abovementioned encoding method is applied on a touch screen, the displaying medium 104 and the screen 102 indicate a same touch screen, and a user may hold an optical pen to manipulate the touch screen by touches or movements of the optical pen on the touch screen.

However, as shown in FIG. 3, while processing delicate manipulations by the optical scanning device 106 so that a movement of the frame center 210 is entirely bounded by a same encoding block 122, i.e., the frame center 210 stays at a same encoding block 122 having a coordinate [X,Y] before and after the movement of the frame center 210 is completed, at this time, the optical scanning device 106 is not capable of recognizing the bounded movement of the frame center 210 so that the frame center 210 is misrecognized to stay other than to be moved within the movement. In other words, a user of the optical scanning device 106 fails to perform delicate manipulations based on the frame center 210 since the recognitions of the coordinate of the frame center 210 are restricted by both a coordinate representation, which takes a size of the encoding block 122 as its unit, and a worse resolution. It indicates that any movement of the frame center 210 has to be long enough to cross two different encoding blocks 122 so that the movement of the frame center 210 can be recognized. Similarly, since a size of a touch point of the held optical pen on the touch screen is significantly restricted by the size of the optical pen, when a size of the touch panel is not larger enough than the held optical pen, using the size of the encoding block 122 as the unit in representing coordinates fails in performing delicate manipulations of the user while locating the accurate location of the frame center 210

SUMMARY OF THE INVENTION

The claimed invention discloses a method of raising resolution in locating on a micro dotmap. The micro dotmap comprises a plurality of encoding blocks arranged according to a first rule. Each of the plurality of encoding blocks comprises a combination of a plurality of microdots to indicate a coordinate of the corresponding encoding block on the micro dotmap. The method comprises fetching a frame on the micro dotmap and defining a datum point on the frame; recognizing one encoding block, at which the datum point is located, on the micro dotmap; decoding the combination of microdots comprised by the recognized encoding block for determining a coordinate of the recognized encoding block on the micro dotmap; and calculating a coordinate of the datum point on the micro dotmap according to relative conditions between the datum point and each microdot comprised by the recognized encoding block.

The claimed invention discloses a method of raising resolution in locating on a micro dotmap. The micro dotmap comprises a plurality of encoding blocks arranged according to a first rule. Each of the plurality of encoding blocks comprises a combination of a plurality of microdots to indicate a coordinate of the corresponding encoding block on the micro dotmap. The method comprises fetching a frame on the micro dotmap and defining a datum point on the frame; recognizing one encoding block, at which the datum point is located, on the micro dotmap; decoding the combination of the plurality of microdots comprised by the recognized encoding block for determining a coordinate of the recognized encoding block on the micro dotmap; and calculating a coordinate of the datum point on the micro dotmap according to relative conditions between the datum point and an origin of the recognized encoding block.

These and other objectives of the present invention will no doubt become obvious to those of ordinary skill in the art after reading the following detailed description of the preferred embodiment that is illustrated in the various figures and drawings.

DETAILED DESCRIPTION

For neutralizing the defect that the movement of the frame center can not be recognized by an optical scanning device since a resolution of taking the size of the encoding block as the unit in the prior art is lower, the present invention discloses a method of raising resolution in locating the frame center on the micro dotmap. Primary characteristics of the disclosed method of the present invention lie in taking a size of a microdot as the unit in representing the coordinate, at which the frame center is located on the micro dotmap, or in determining a distance scale between parallel projections of the frame center on each microdot set and an origin of the encoding block, so that the representation of coordinates by taking the size of the encoding block as units in the prior art is replaced.

Figure 1:
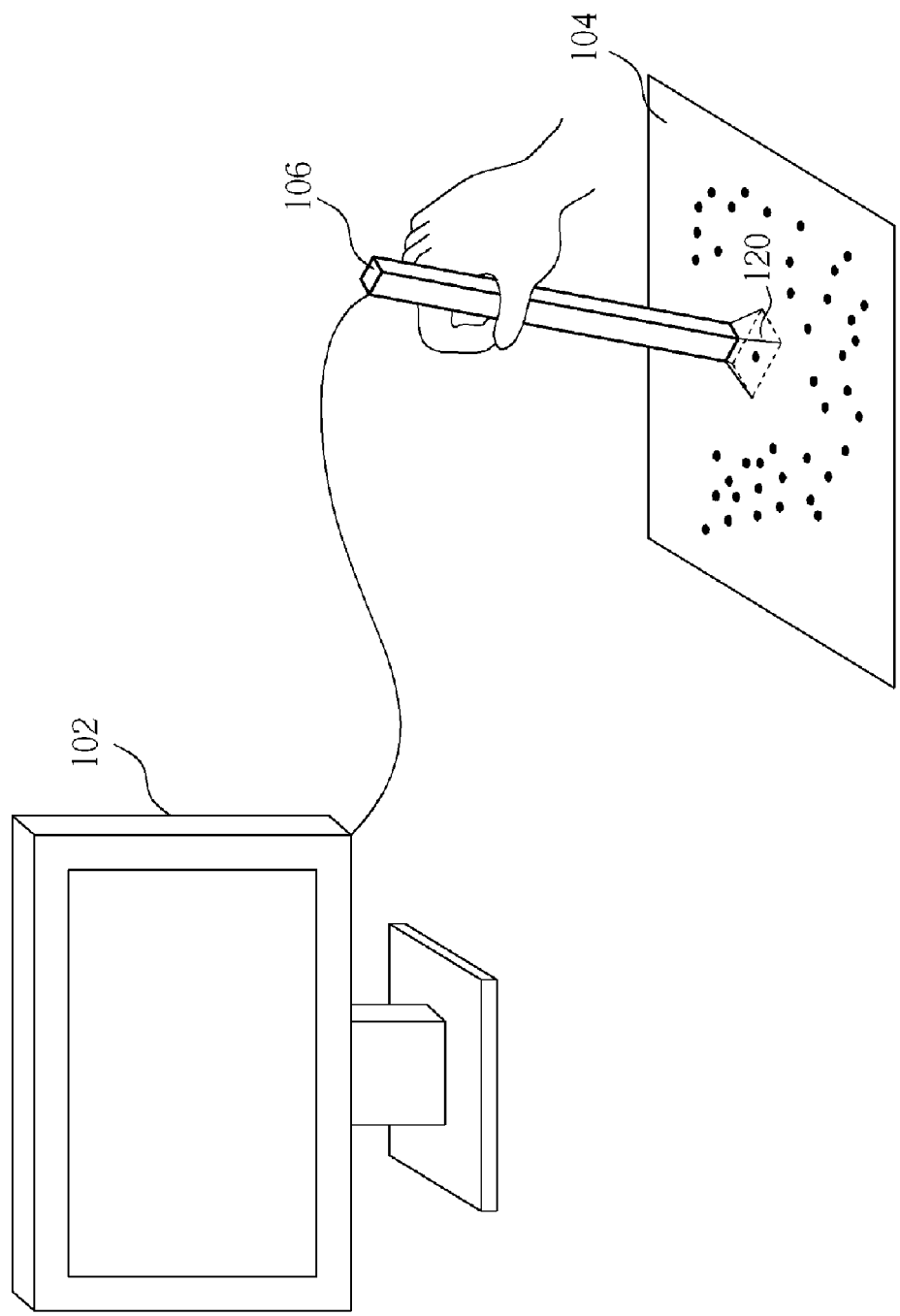
FIG. 1 illustrates scanning a displaying medium printed with a micro dotmap by manipulating an optical scanning device in a hand-writing manner so as to display tracks of the optical scanning device on a screen corresponding to a movement of the optical scanning device on the displaying medium.
Figure 2:
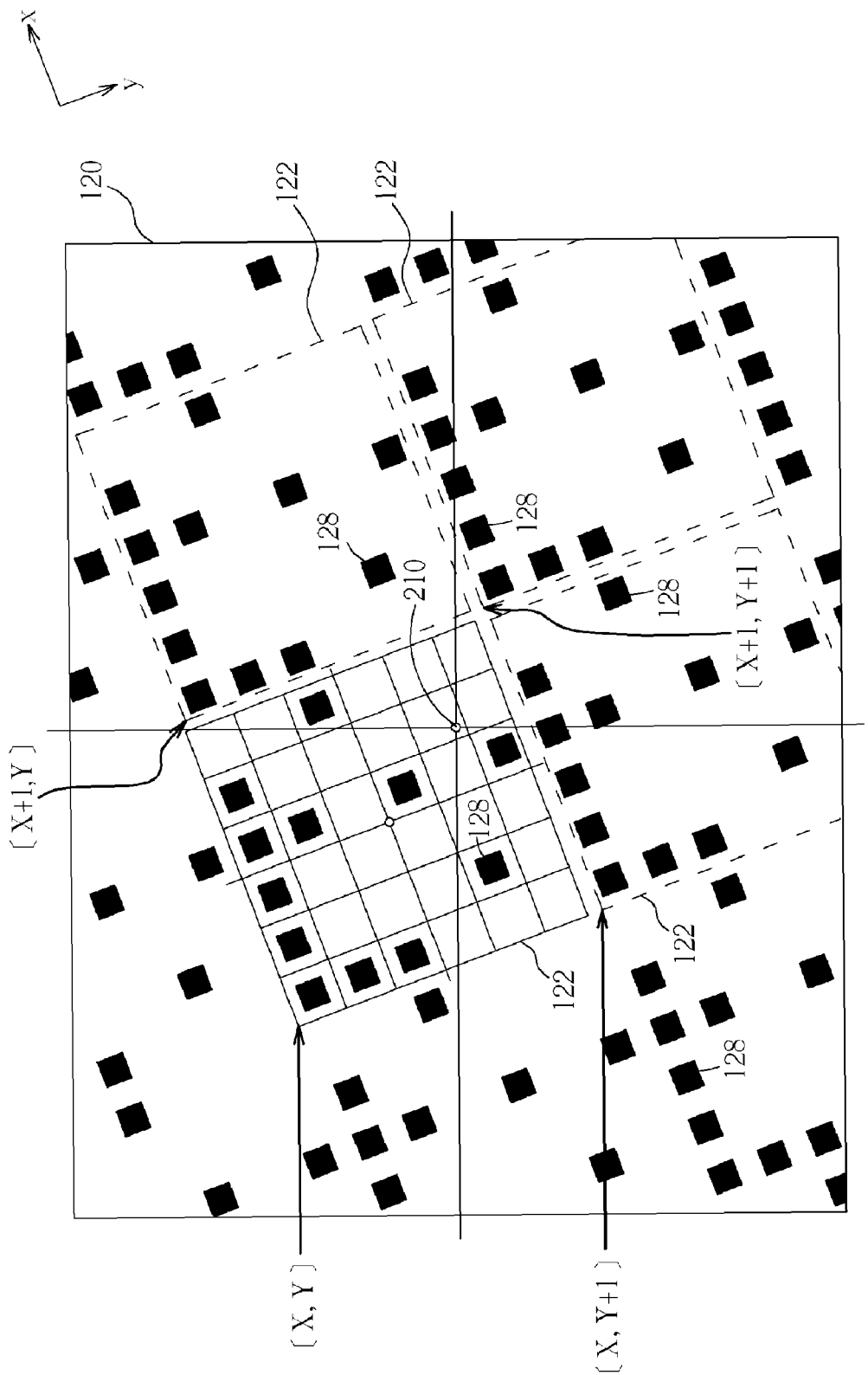
FIG. 2 illustrates a frame retrieved by scanning the displaying medium shown in FIG. 1 with the optical scanning device shown in FIG. 1.
Figure 3:
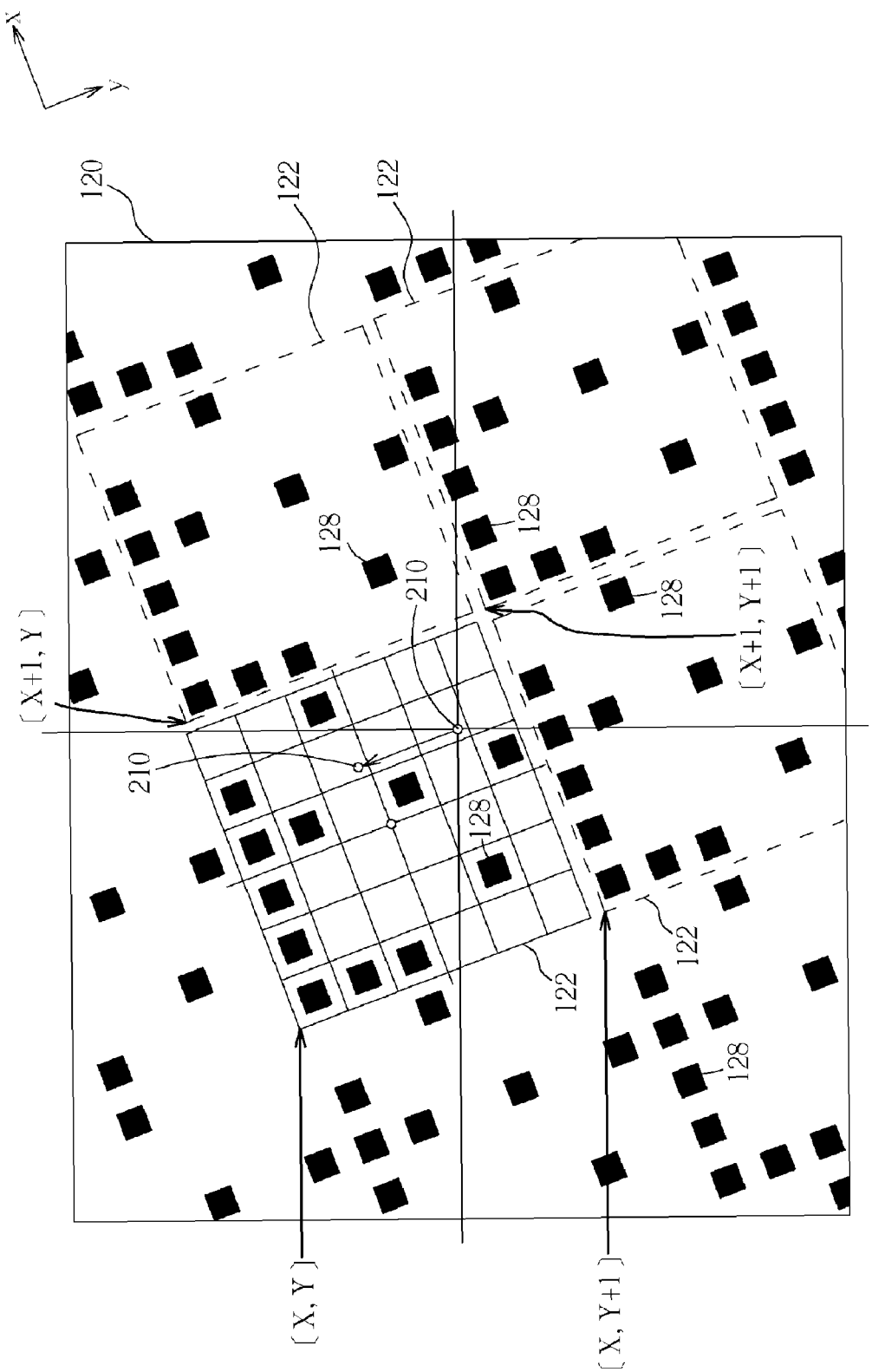
FIG. 3 illustrates a condition that while manipulating the frame center on the screen shown in FIG. 2, a movement of the frame center is too short to locating the frame center.
Figure 4:
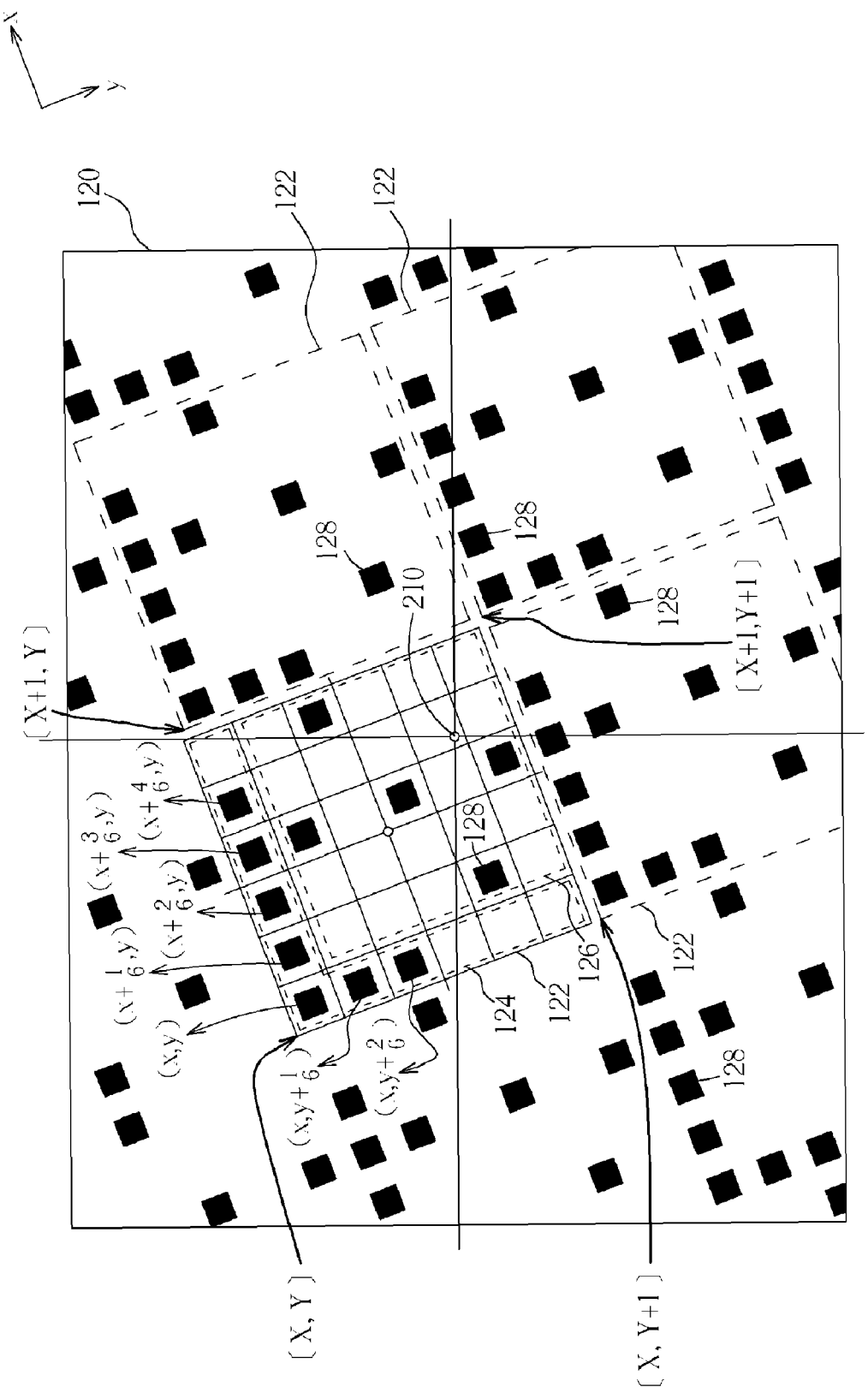
FIG. 4 illustrates locating the frame center shown in FIG. 3 by taking a size of the microdot as the unit for describing the method of raising resolution in locating on the micro dotmap in the present invention.
Figure 5:
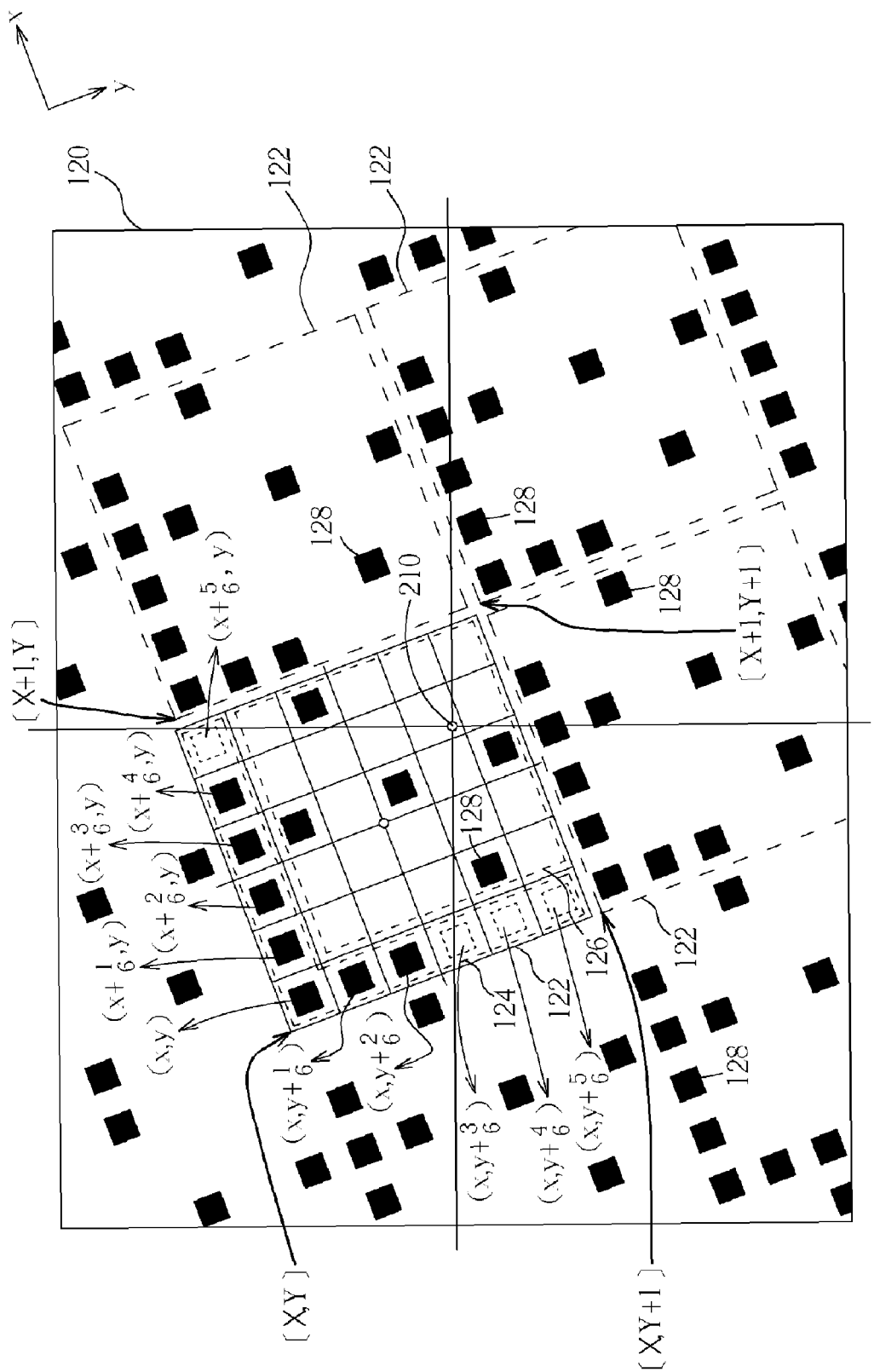
FIG. 5 schematically illustrates the frame shown in FIG. 4 after determining the virtual microdots by using interpolation, where locations of the virtual microdots are marked by virtual grid dots shown in FIG. 5, and the coordinates of the virtual grid dots are also marked.
Figure 6:
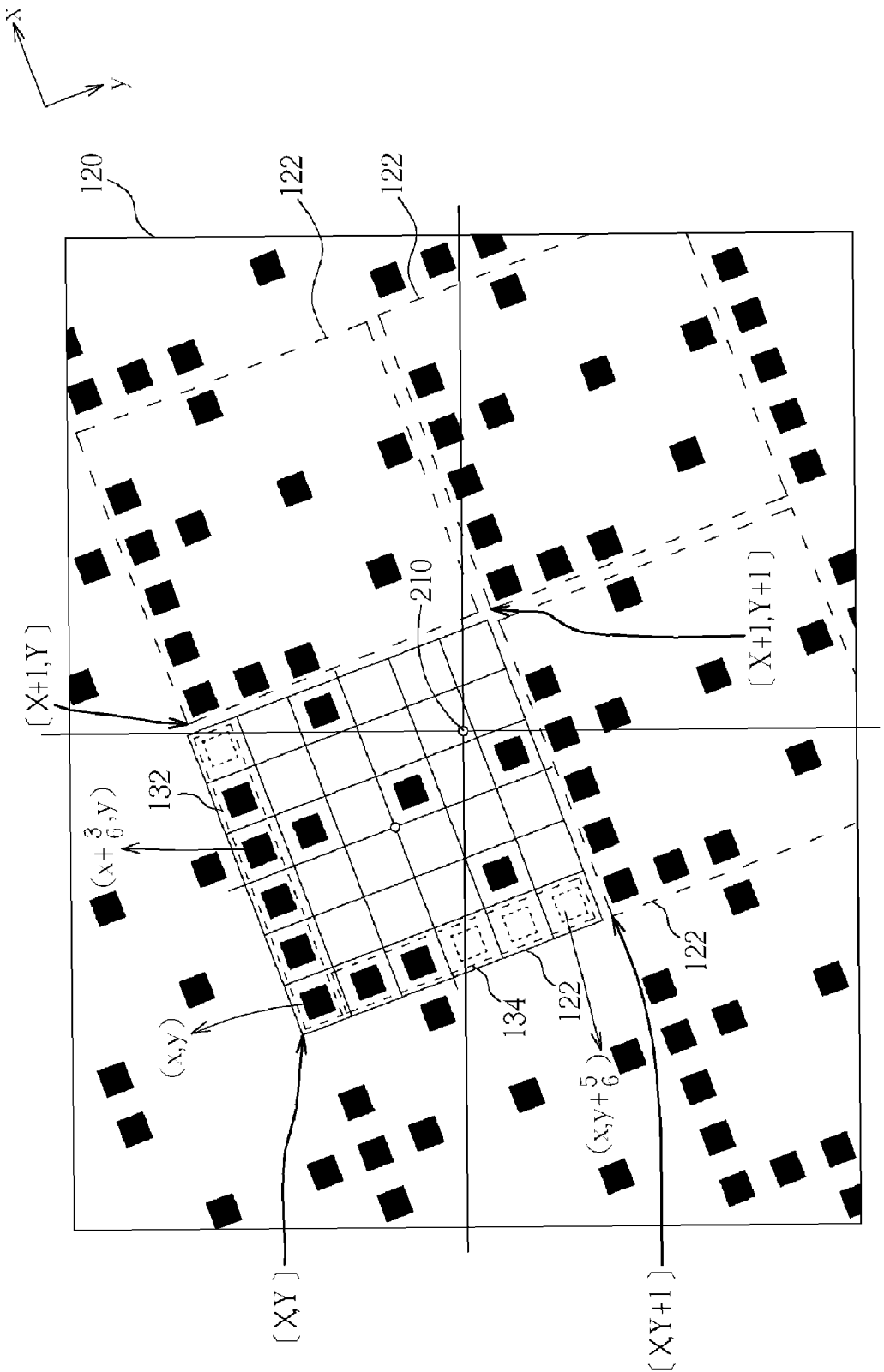
FIG. 6 schematically illustrates a first microdot set, which has a plurality of microdots having a same Y-coordinate in the header region, and a second microdot set, which has a plurality of microdots having a same X-coordinate in the header region.

Please refer to FIG. 4, which illustrates locating the frame center 210 shown in FIG. 3 by taking a size of the microdot as the unit for describing the method of raising resolution in locating on the micro dotmap in the present invention. Note that the unit of the coordinates shown in FIG. 4 is the size of the microdots, whereas the unit of the coordinates shown in FIG. 1 is the size of the encoding blocks. However, for differentiating units using sizes of an encoding block and a microdot, the coordinates having the unit as the size of the encoding block are indicated as [X,Y], [X+1,Y], [X,Y+1], [X+1,Y+1], and etc., whereas the coordinates having the unit as the size of the microdot are indicated as (x,y), (x+3/6,y), (x,y+2/6), and etc. Note that for clearly describing the disclosed method of the present invention, both the header region 124 and the data region 128 shown in FIG. 2 are not illustrated in each encoding block 122 covered by the frame 120. Note that when the size of the microdot is taken as the unit in encoding coordinates on the displaying medium 104, the encoding block 122 includes a first plurality of microdots 128, which are physically printed on the displaying medium 104, and a second plurality of microdots 128, which are not physically printed on the displaying medium 104. Note that coordinates of the second plurality of microdots 128 may also be determined or recognized by using interpolation on the first plurality of microdots 128 with the aid of the optical scanning device 106. For clear descriptions hereafter, the first plurality of microdots 128 are called as physical microdots, and the second plurality of microdots 128 are called as virtual microdots. In other words, the microdots required to be recognized or determined by using interpolation are virtual microdots. Please refer to FIG. 5, which schematically illustrates the frame 120 shown in FIG. 4 after determining the virtual microdots 128 by using interpolation, where locations of the virtual microdots 128 are marked by virtual grid dots shown in FIG. 5, and the coordinates of the virtual grid dots are also marked. As can be observed in FIG. 4 and FIG. 5, within the header region 124 of the encoding block 122 having the coordinate [X,Y], X-coordinates of the microdots 128 distributed along the X-axis are incremented from x to (x+⅚), whereas Y coordinates of said microdots 128 are the same. Similarly, X-coordinates of the microdots 128 distributed along the Y-axis and in the header region 124 are x, whereas Y-coordinates of said microdots 128 are incremented from y to (y+⅚). Please refer to FIG. 6, which schematically illustrates a first microdot set 132, which has a plurality of microdots 128 having a same Y-coordinate in the header region 124, and a second microdot set 134, which has a plurality of microdots 128 having a same X-coordinate in the header region 124. Note that a microdot 128 having the coordinate (x, y) may be classified into either the first microdot set 132 or the second microdot set 134 and is not restricted to the classification shown in FIG. 6. Note that though each side of the encoding block 122 shown in FIG. 4, FIG. 5 and FIG. 6 are equally segmented by six microdots, in other embodiments of the present invention, each the side of the encoding block 122 may also be equally segmented by a number, which is other than six, of microdots. Moreover, as the number of microdots for equally segmenting each the side of the encoding block 122 is increased, a higher resolution in the disclosed method of the present invention is also reached. In other words, using different numbers of microdots in equally segmenting each the side of the encoding block 122 should not be limitations to the present invention.

Figure 7:
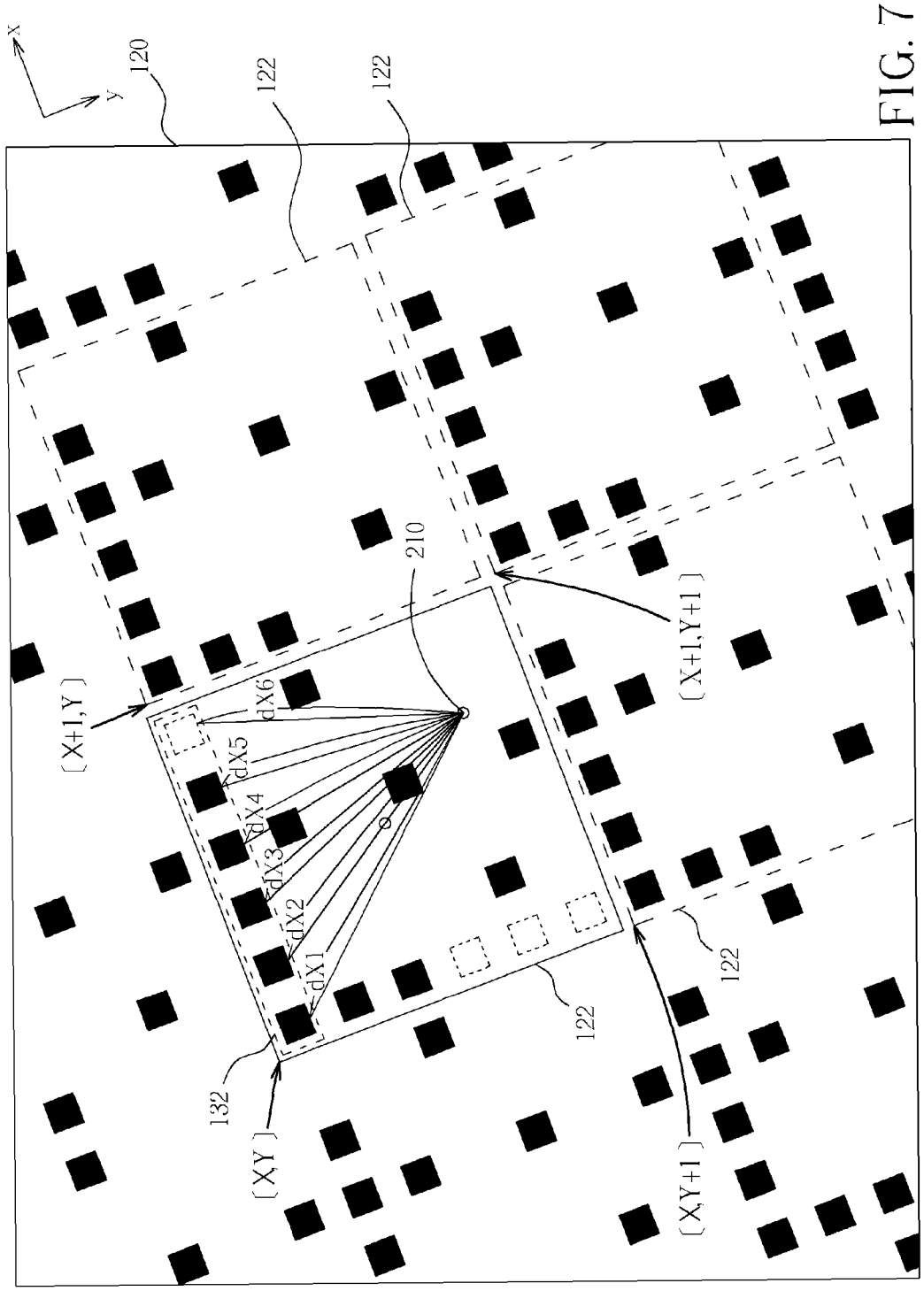
FIG. 7, FIG. 8, and FIG. 9 illustrate a diagram of locating the frame center according to the microdots shown in FIG. 4, FIG. 5, and FIG. 6, and according to a first embodiment of the present invention.
Figure 8:
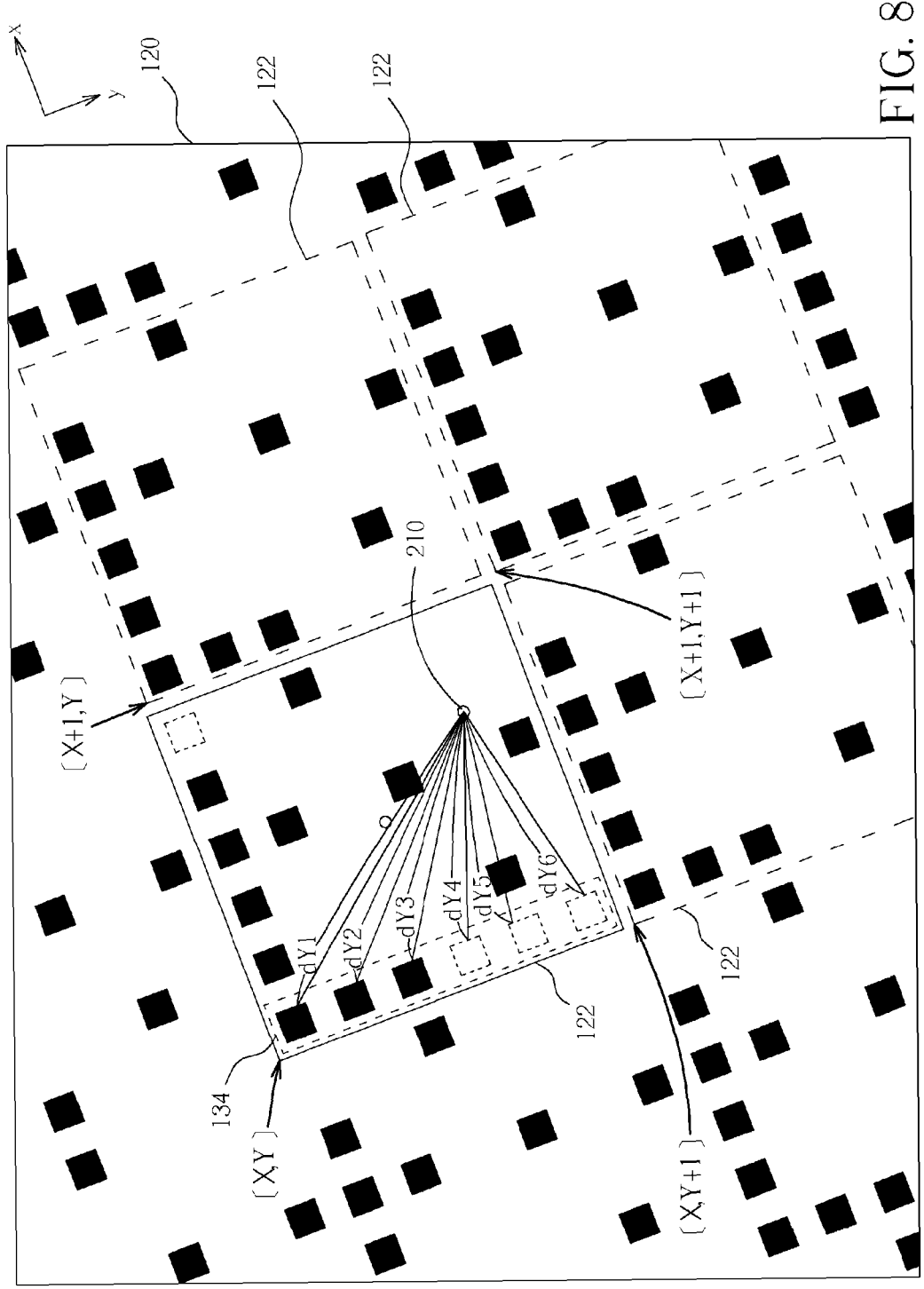
Figure 9:
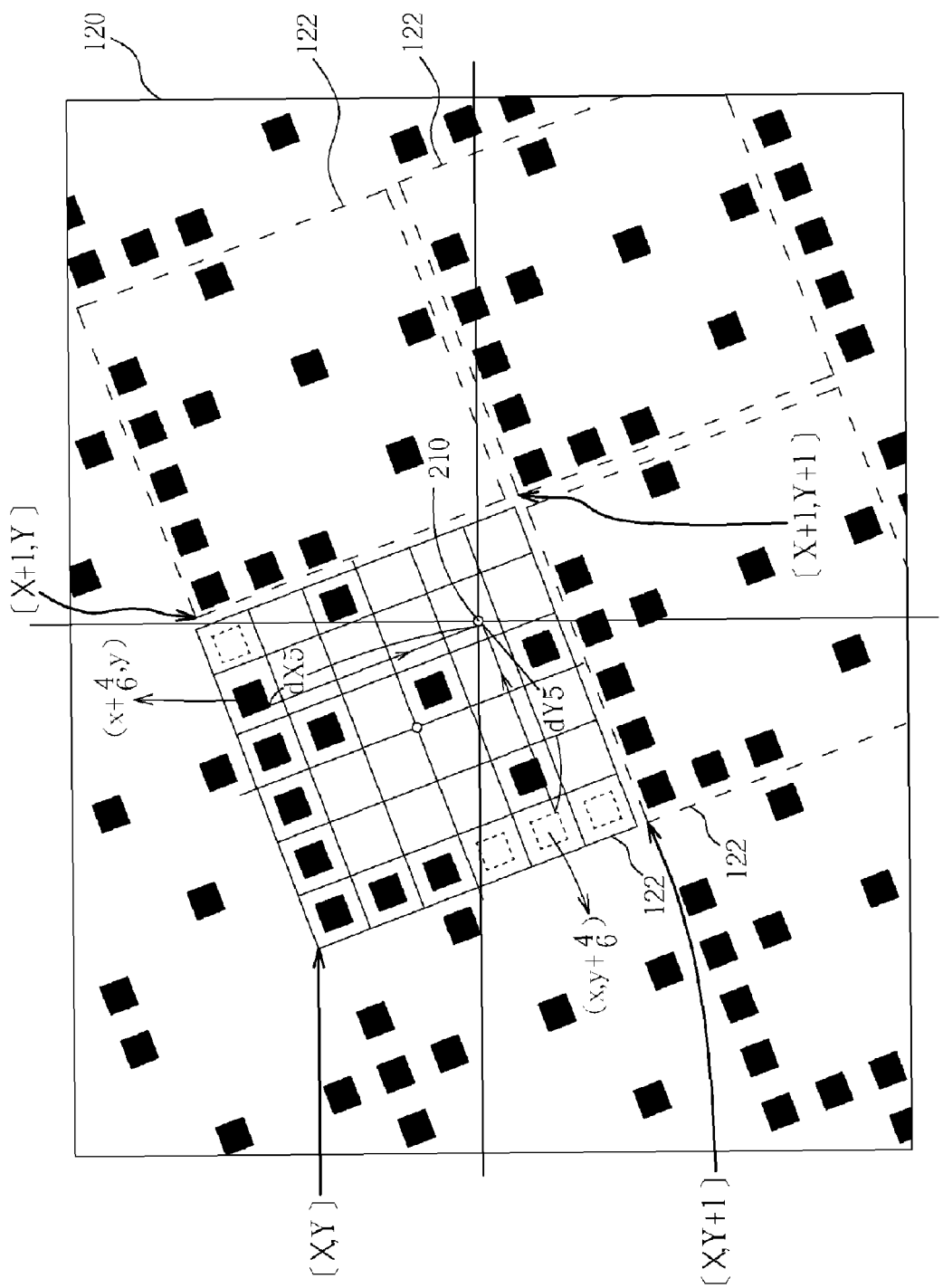

Please refer to FIG. 7, FIG. 8, and FIG. 9, all of which illustrate a diagram of locating the frame center 210 according to the microdots shown in FIG. 4, FIG. 5, and FIG. 6, and according to a first embodiment of the present invention. In FIG. 7, a distance between the frame center 210 and each microdot of the first microdot set 132 is calculated in advance, i.e., the distances dX1, dX2, dX3, dX4, dX5, and dX6 are calculated herein, for determining a closest X-coordinate of the frame center 210. Similarly, in FIG. 8, a distance between the frame center 210 and each microdot of the second microdot set 134 is also calculated in advance, i.e., the distances dY1, dY2, dY3, dY4, dY5, and dY6 are calculated herein, for determining a closest Y-coordinate of the frame center 210. The principle in this embodiment is indicated by the fact that a shortest distance between a point and a first line is a line segment, which is formed on a second line passing through the point and being orthogonal to the first line. As can be observed from FIG. 7 and FIG. 8, when the coordinate of the frame center 210 is calculated by taking the size of the microdot as the unit, a first orthogonal line segment and a second orthogonal line segment may respectively indicate an approximate X-coordinate and a Y-coordinate of the frame center 210, where the first orthogonal line segment is orthogonal to a line formed by the first microdot set 132 and begins at the frame center 210, an second orthogonal line segment is orthogonal to a line formed by the second microdot set 134 and begins at the frame center 210 as well. In summary, among the first microdot set 132, a microdot 128 having a shortest distance from the frame center 210 indicates a closest X-coordinate of the frame center 210; similarly, among the second microdot set 134, a microdot 128 having a shortest distance from the frame center 210 indicates a closest Y-coordinate of the frame center 210. As can be observed from FIG. 7, among microdots 128 of the first microdot set 132, a distance dX5 from the frame center 210 is the shortest. Similarly, as can be observed from FIG. 8, among microdots 128 of the second microdot set 134, a distance dY5 from the frame center 210 is the shortest. Therefore, in FIG. 9, a X-coordinate (x+⅚) referred by the distance dX5 approximates the X-coordinate of the frame center 210, and a Y-coordinate (y+⅚) referred by the distance dY5 approximates the Y-coordinate of the frame center 210. In other words, an original coordinate [X,Y] of the frame center 210 referred by the unit of the size of an encoding block is replaced by an updated coordinate (x+⅚,Y+⅚) referred by the unit of the size of a microdot, and the aim of raising resolution in locating the frame center 210 in the present invention is thus achieved.

Figure 10:
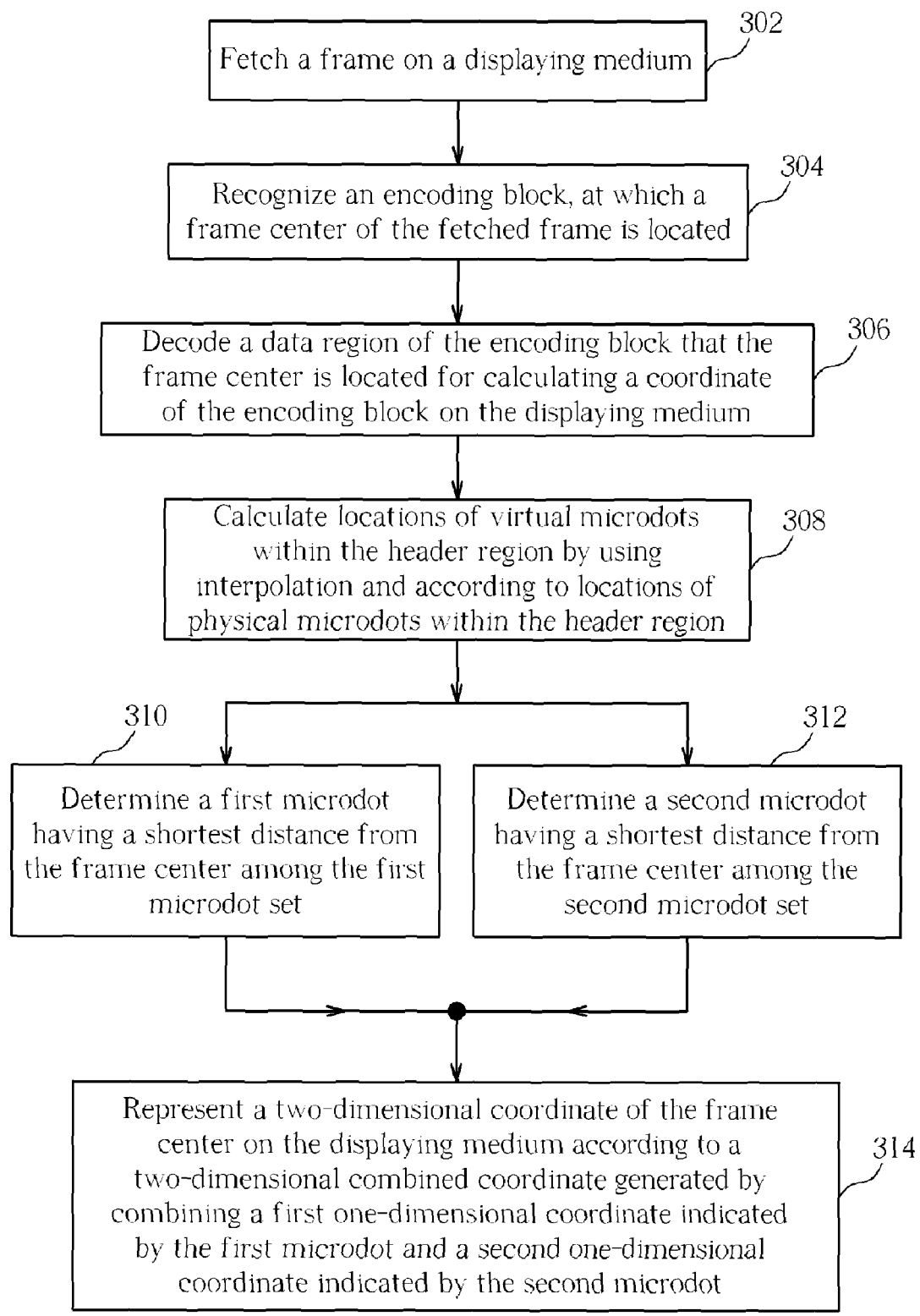
FIG. 10 illustrates a flowchart of the method of raising resolution disclosed in the present invention, where the flowchart corresponds to descriptions and diagrams from FIG. 4 to FIG. 9.

Please refer to FIG. 10, which illustrates a flowchart of the method of raising resolution disclosed in the present invention, where the flowchart corresponds to descriptions and diagrams from FIG. 4 to FIG. 9. As shown in FIG. 10, the disclosed method includes steps as follows:

Step 302: Fetch a frame on a displaying medium;

Step 304: Recognize an encoding block, at which a frame center of the fetched frame is located, according to a header region of each encoding block covered by the fetched frame;

Step 306: Decode a data region of the encoding block that the frame center is located for calculating a coordinate of the encoding block on the displaying medium;

Step 308: Calculate locations of virtual microdots within the header region by using interpolation and according to locations of physical microdots within the header region;

Step 310: Determine a first microdot having a shortest distance from the frame center among the first microdot set according to a distance between the frame center and each microdot of the first microdot set;

Step 312: Determine a second microdot having a shortest distance from the frame center among the second microdot set according to a distance between the frame center and each microdot of the second microdot set; and Step 314: Represent a two-dimensional coordinate of the frame center on the displaying medium according to a two-dimensional combined coordinate generated by combining a first one-dimensional coordinate indicated by the first microdot and a second one-dimensional coordinate indicated by the second microdot, where the two-dimensional combined coordinate takes a size of a microdot as its unit.

Related descriptions and diagrams from Step 302 to Step 314 have been disclosed from those of from FIG. 4 to FIG. 9 and are not further described herein. However, when microdots within the header region 124 are all physical, Step 308 may be skipped since locations of virtual microdots are not required to be calculated by interpolation at this time.

Figure 11:
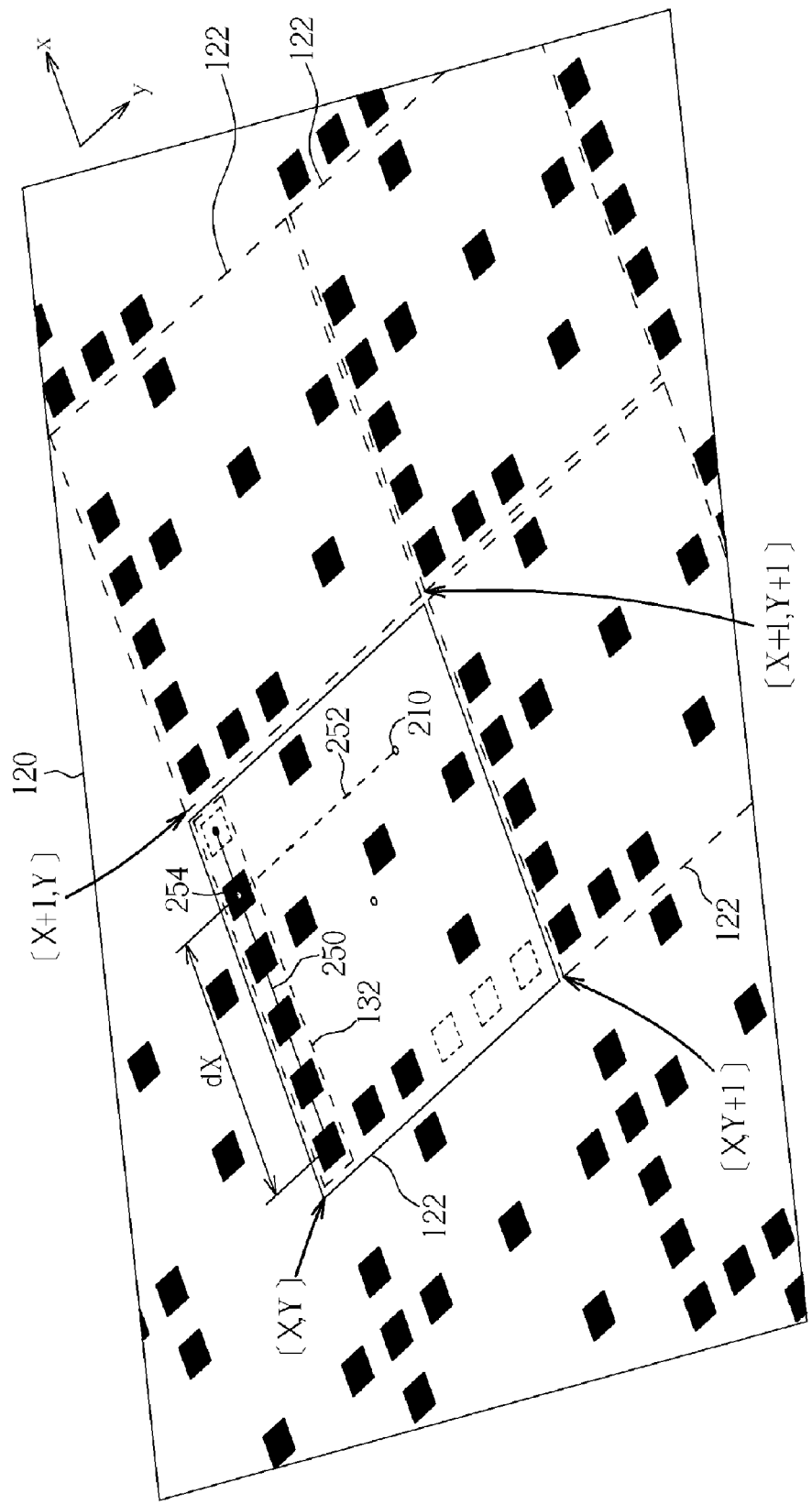
FIG. 11, FIG. 12, and FIG. 13 are diagrams of estimating a corresponding coordinate of the frame center according to parallel projection points of the frame center respectively on the X-axis and the Y-axis when the X-axis and the Y-axis are not orthogonal with each other in comparison to as shown in FIG. 7, FIG. 8, and FIG. 9 according to a second embodiment of the present invention.
Figure 12:
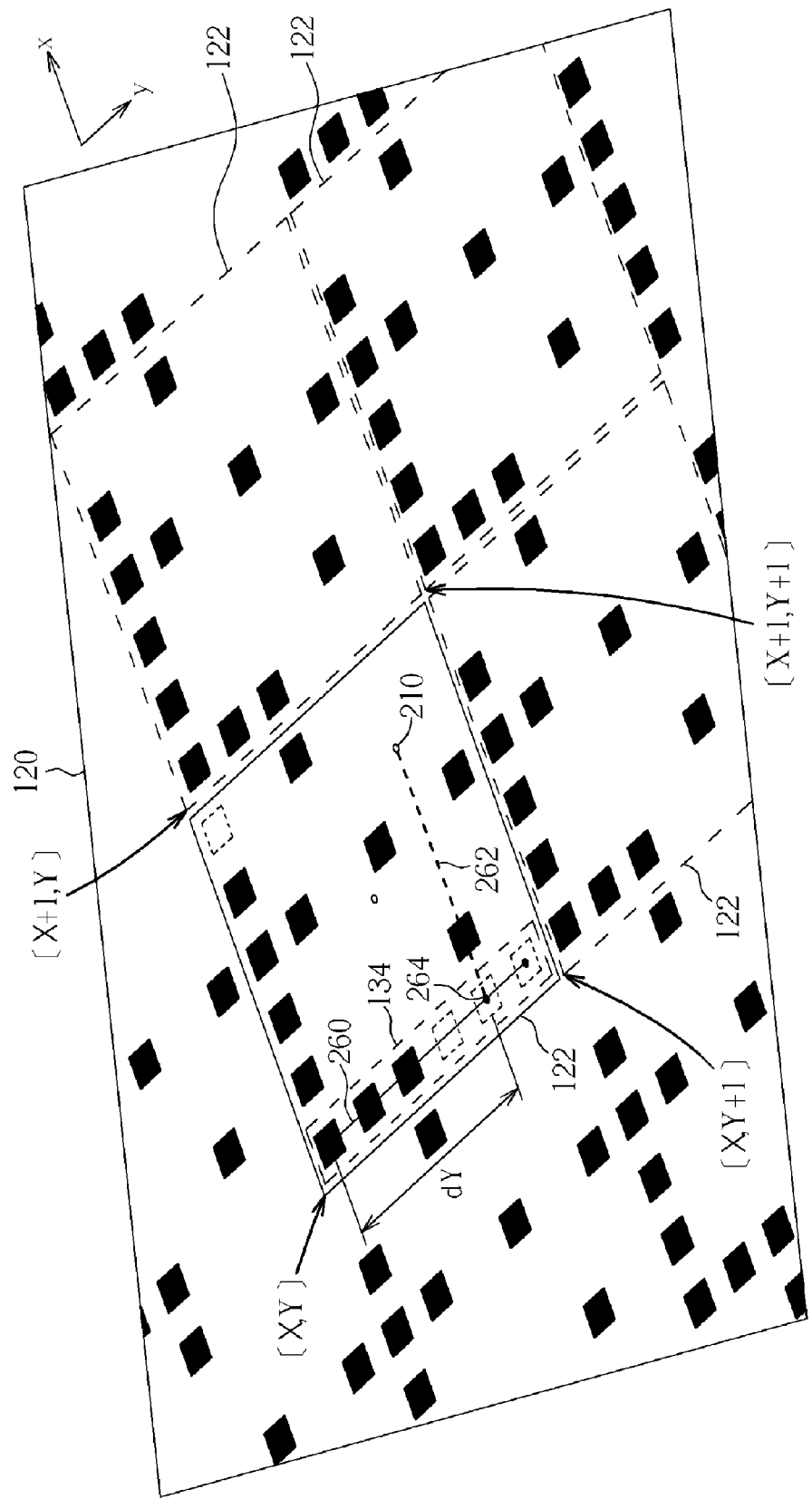
Figure 13:
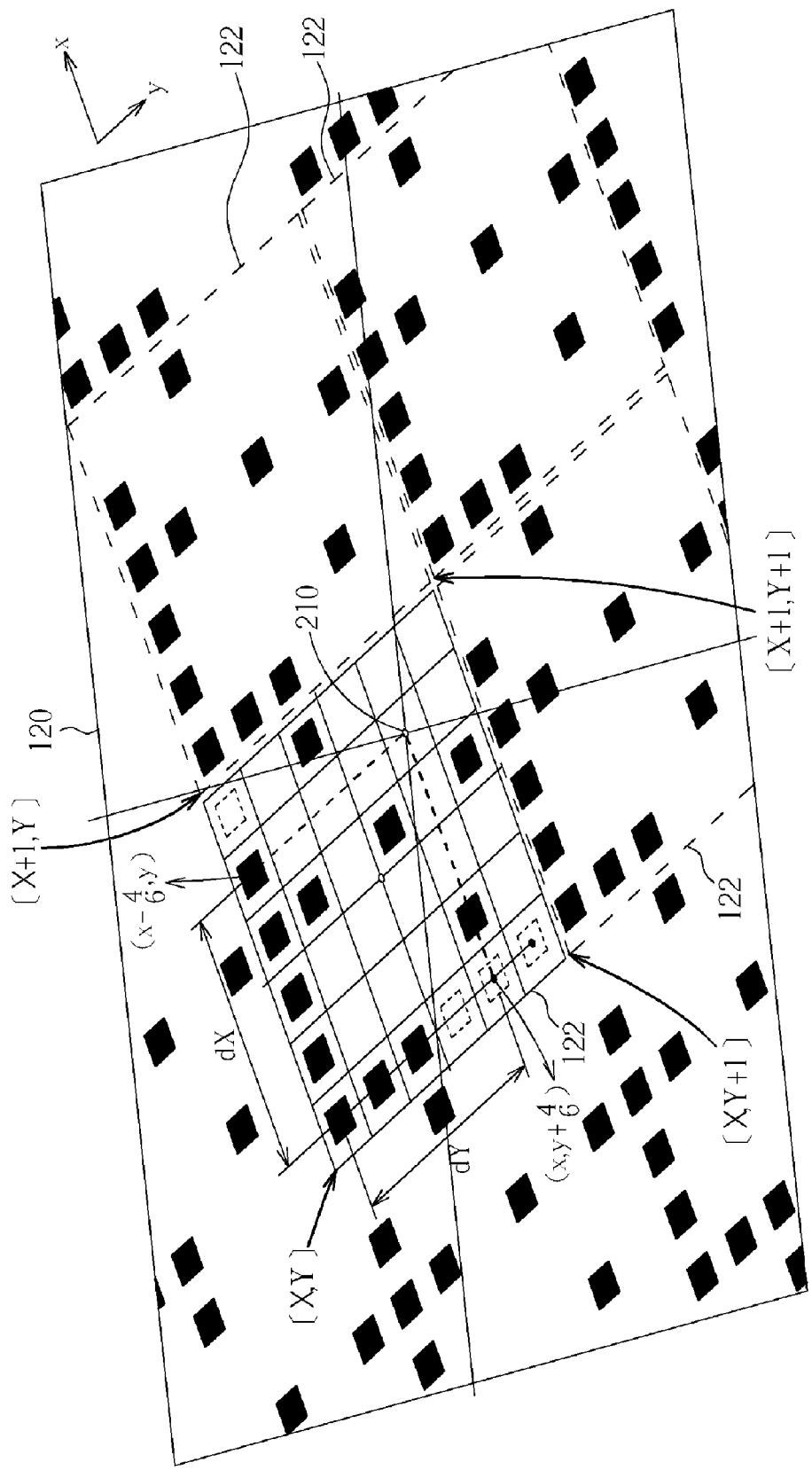

In the abovementioned embodiments, the X-axis and the Y-axis on the micro dotmap are assumed to be orthogonal with each other, and moreover, corresponding one-dimensional coordinates of the frame center are determined by taking shortest distances from the frame center to both the coordinate axes. However, in other embodiments of the present invention, both the axes may not be orthogonal with each other so that the method described from FIG. 7 to FIG. 9 cannot be applied at this time. For relieving the defect, in a second embodiment of the present invention, two parallel projection points of the frame center 210 respectively lying on the X-axis and the Y-axis are used for estimating both the X-coordinate and the Y-coordinate of the frame center 210 on the micro dotmap. Please refer to FIG. 11, FIG. 12, and FIG. 13, which are diagrams of estimating a corresponding coordinate of the frame center 210 according to parallel projection points of the frame center 210 respectively on the X-axis and the Y-axis when the X-axis and the Y-axis are not orthogonal with each other in comparison to as shown in FIG. 7, FIG. 8, and FIG. 9 according to a second embodiment of the present invention. As shown in FIG. 11, FIG. 12, and FIG. 13, an included angle between the X-axis and the Y-axis on the micro dotmap is not 90⁰. Before the parallel projection points of the frame center 210 are determined, steps from Step 302 to Step 308 are assumed to be complete. Then, in FIG. 11, the X-coordinate projected from the frame center 210 is determined; in FIG. 12, the Y-coordinate projected from the frame center 210 is determined; and last, in FIG. 13, both the determined X- and Y-coordinates are combined to generate the two-dimensional coordinate of the frame center 210 on the micro dotmap, where the combined coordinate reaches higher resolution in locating the frame center 210 than using the size of a microdot as its unit.

In FIG. 11, FIG. 12, and FIG. 13, physical microdots and virtual microdots within the first microdot set 132 are connected with a first line segment 250, whereas physical microdots and virtual microdots within the second microdot set 134 are connected with a second line segment 260 as well. A length of each of the first line segment 250 and the second line segment 260 equals the length of each side of single encoding block, i.e., the length of one unit while taking the size of the encoding block as the unit of coordinates. Note that the first line segment 250 is parallel to the X-axis, and the second line segment 260 is parallel to the Y-axis.

In FIG. 11, a third line segment 252, which has a same slope with the second line segment 260 and stretches from the frame center 210 to the first line segment 250, is drawn for determining a first intersection 254, which is located at the intersection of the first line segment 250 and the third line segment 252. Note that the first intersection 254 is just the parallel projection point of the frame center 210 on the X-axis. The X-coordinate of the first intersection 254 is indicated by a distance dX from the original of the encoding block covering the frame center 210 to the first intersection 254. Note that the length of the first line segment 250 stands for one unit in representing coordinates at this time. Therefore, as long as the length of the distance dX is acquired, the X-coordinate of the frame center 210 may be precisely determined and lead to higher resolution than using the size of the microdot as the unit.

Similarly, in FIG. 12, a fourth line segment 262, which has a same slope with the first line segment 250 and stretches from the frame center 210 to the second line segment 260, is drawn for determining a second intersection 264, which is located at the intersection of the fourth line segment 262 and the second line segment 260. Note that the second intersection 264 is just the parallel projection point of the frame center 210 on the Y-axis. The Y-coordinate of the second intersection 264 is indicated by the distance dY from the origin (located at the coordinate (x,y)) of the encoding block covering the frame center 210 to the second intersection 264. Since the length of the second line segment 260 stands for one unit, as a result, as long as the length of the distance dY is acquired, the Y-coordinate of the frame center 210 may also be precisely determined.

In FIG. 13, according to both the determined distances dX and dY, the coordinate (x+dX, y+dY) of the frame center 210 on the micro dotmap is determined. Note that the coordinate (x+dX, y+dY) indicates higher resolution than the coordinate (x+⅚, Y+⅚) determined in FIG. 9. Note that the embodiment disclosed in FIG. 11, FIG. 12, and FIG. 13 may also be applied on the embodiment disclosed in FIG. 7, FIG. 8, and FIG. 9.

Figure 14:
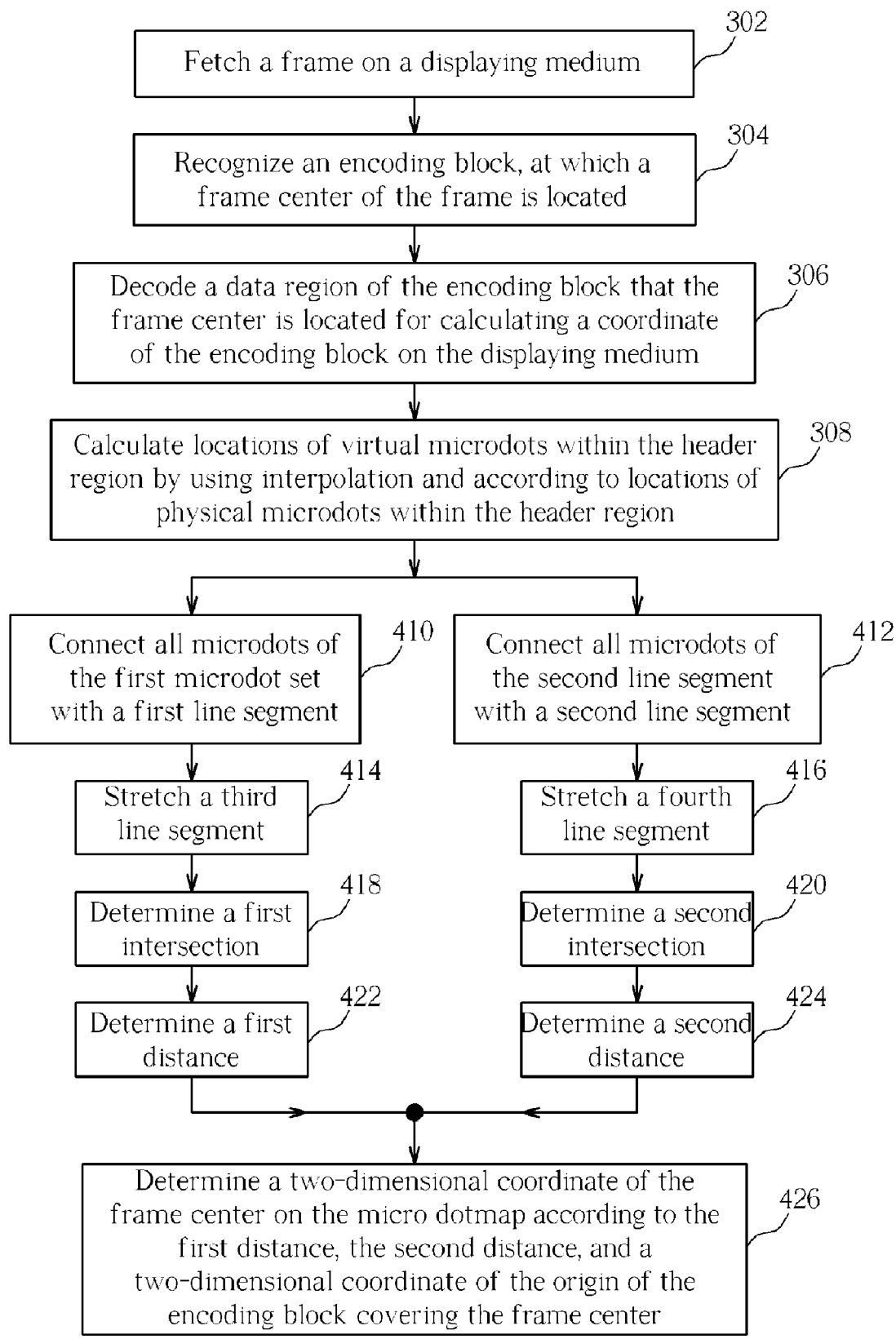
FIG. 14 is a flowchart of the disclosed method of raising resolution in locating and about the descriptions from FIG. 11 to FIG. 13 according to a second embodiment of the present invention.

Please refer to FIG. 14, which is a flowchart of the disclosed method of raising resolution in locating and about the descriptions from FIG. 11 to FIG. 13 according to a second embodiment of the present invention. As shown in FIG. 14, the disclosed method includes steps as follows:

Step 302: Fetch a frame on a displaying medium;

Step 304: Recognize an encoding block, at which a frame center of the frame is located, according to a header region of each encoding block covered by the frame;

Step 306: Decode a data region of the encoding block that the frame center is located for calculating a coordinate of the encoding block on the displaying medium;

Step 308: Calculate locations of virtual microdots within the header region by using interpolation and according to locations of physical microdots within the header region;

Step 410: Connect all microdots of the first microdot set with a first line segment;

Step 412: connect all microdots of the second line segment with a second line segment;

Step 414: Stretch a third line segment having a same slope with the second line segment from the frame center to the first line segment;

Step 416: Stretch a fourth line segment having a same slope with the first line segment from the frame center to the second line segment;

Step 418: Determine a first intersection between the first line segment and the third line segment;

Step 420: Determine a second intersection between the second line segment and the fourth segment;

Step 422: Determine a first distance from an origin of the encoding block covering the frame center to the first intersection;

Step 424: Determine a second distance from the origin of the encoding block covering the frame center to the second intersection; and Step 426: Determine a two-dimensional coordinate of the frame center on the micro dotmap according to the first distance, the second distance, and a two-dimensional coordinate of the origin of the encoding block covering the frame center.

Figure 15:
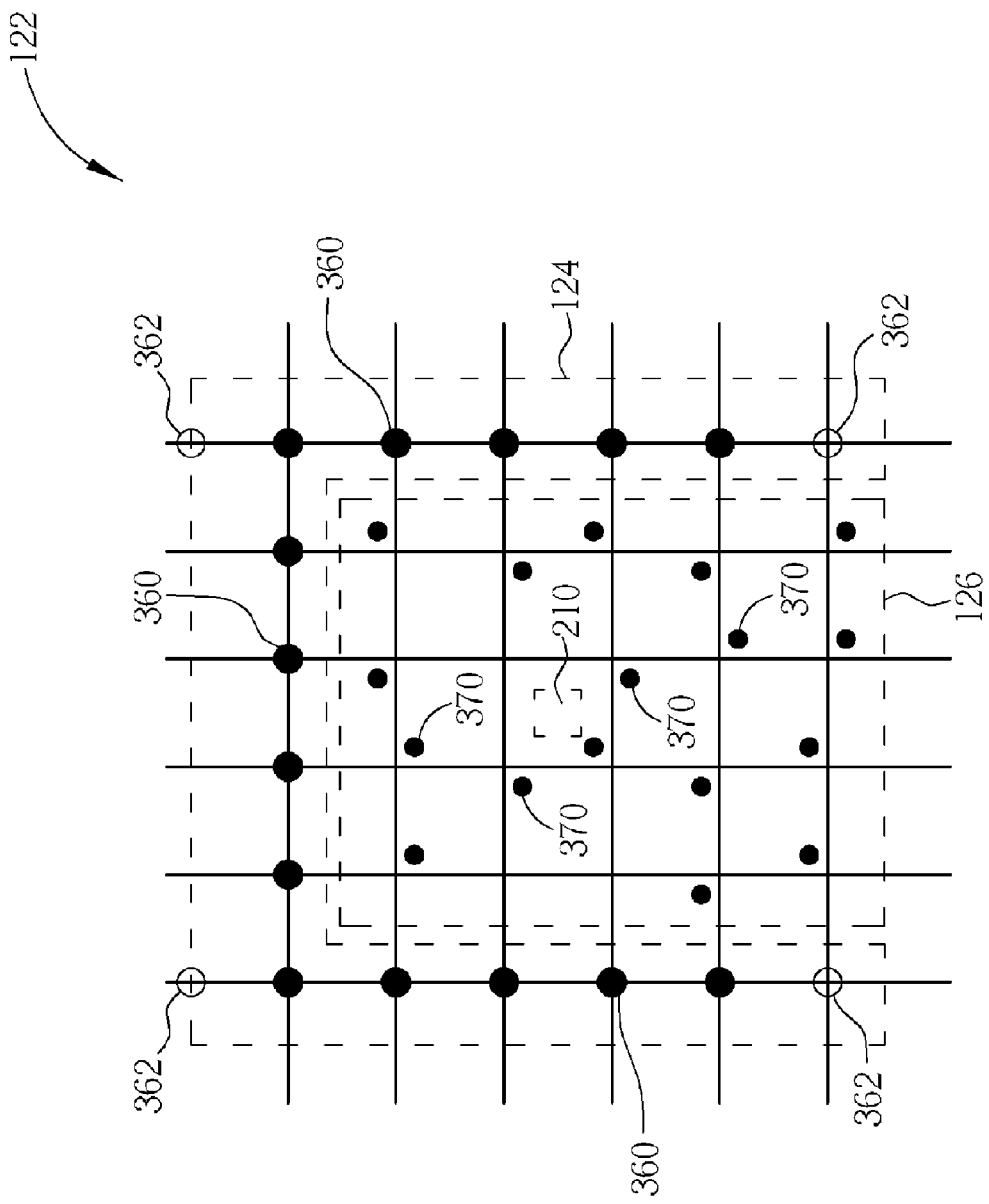
FIG. 15 illustrates using grid dots for indicating microdots shown from FIG. 2 to FIG. 13.

Note that though microdots of the micro dotmap illustrated from FIG. 2 to FIG. 13 are indicated with rectangle codes and applied in the disclosed method of raising resolution in locating in the present invention, the disclosed method of the present invention may also be applied on other types of micro dotmaps. Please refer to FIG. 15, which illustrates using grid dots for indicating microdots shown from FIG. 2 to FIG. 13. In the encoding block 122 shown in FIG. 15, each grid dot of the encoding block 122 may be a physical grid dot or a virtual grid dot. As shown in FIG. 15, physical grid dots 360 are distributed on boarders of the encoding block 122; furthermore, there are two virtual grid dots 362 on the boarders of the encoding block 122 for serving as indicating grid dots to indicate orientation of the encoding block 122. In other words, in the embodiment illustrated in FIG. 15, the boarders of the encoding block 122 just indicate the header region 124. The encoding block 122 further include the data region 126, within which a plurality of data grid dots 370 are distributed around inner intersections of grid lines within the encoding block 122. As can be observed from FIG. 15, at each intersection within the encoding block 122, four quadrants are segmented by grid lines. Disposing one data grid dot 370 at one of the four quadrants may used for indicating a value of different bits. Please refer to the frame center 210 shown in FIG. 15. As long as a distance between the frame center 210 and each grid dot within the header region 124 is measured, the method disclosed in FIG. 10 may used for rapidly locating the frame center 210 by taking the size of the microdot as the unit. Similarly, as long as determining both the parallel projection points of the frame center 210 at two neighboring boarders of the encoding block 122, distance scales between the origin of the encoding block 122 and each the parallel projection point may be used for locating the frame center 210 with high resolution, i.e., applying the method described in FIG. 14. In other words, the embodiment described in FIG. 15 may be easily applied on methods disclosed in FIG. 10 and FIG. 13 in the present invention so that repeated descriptions are saved for brevity.

Figure 16:
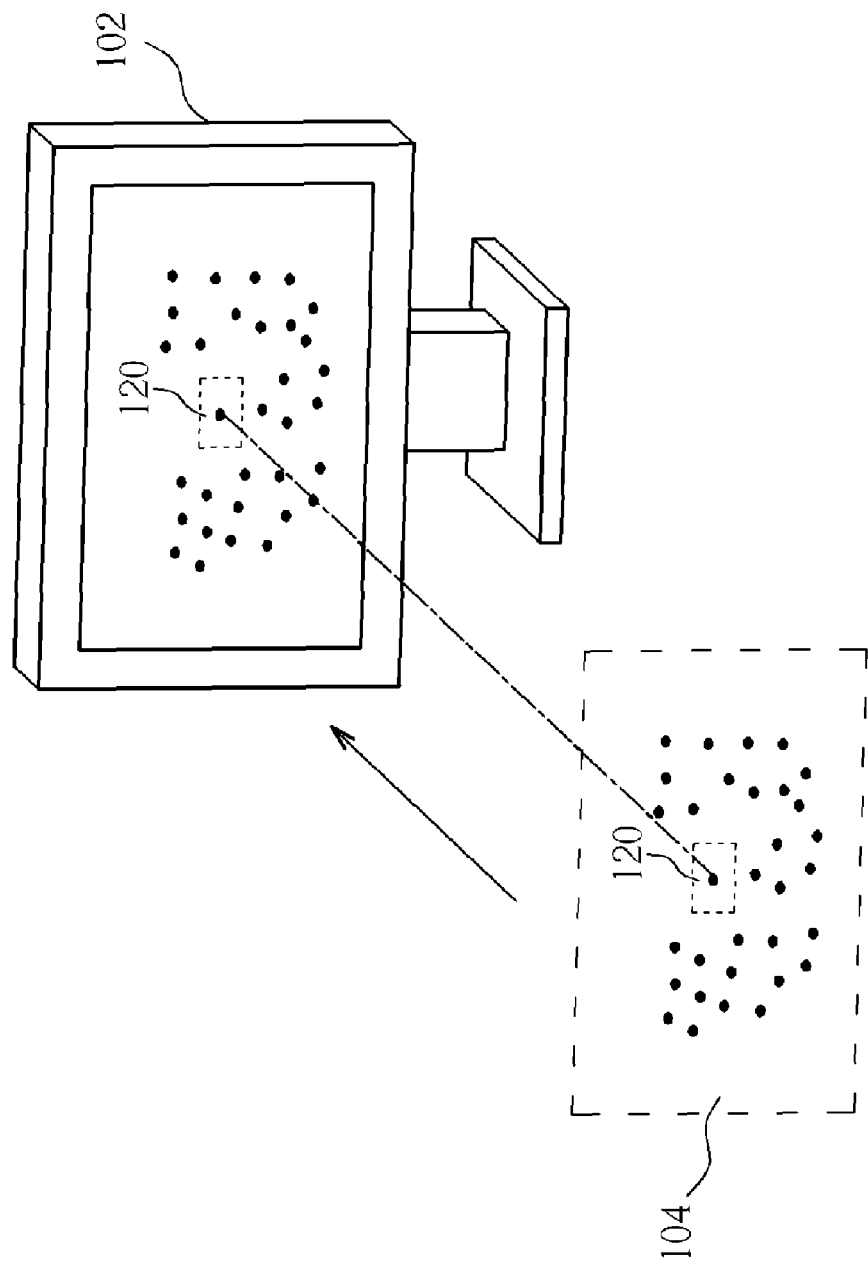
FIG. 16 illustrates using a transparent or black displaying medium and white microdots on a liquid crystal display (LCD) for encoding microdots in a similar manner with FIG. 1.

In FIG. 1, the displaying medium 104 is colored in white to serve as a background, and may be printed with black microdots for indicating both the micro dotmap and the microdots illustrated in the above diagrams so as to implement the disclosed method of the present invention, where the displaying medium 104 may be implemented with an electronic displaying device or an electronic paper. However, the microdots may also be printed with inks corresponding to various wavelengths in lights so as to match displaying media made of various materials or to match other types of microdot representations in other embodiments of the present invention. Please refer to FIG. 16, which illustrates using a transparent or black displaying medium and white microdots on a liquid crystal display (LCD) for encoding microdots in a similar manner with FIG. 1. On a conventional touch-triggered LCD, for preventing light reflection, a display panel of the LCD may be made of certain materials capable of absorbing visible lights. When the display panel is implemented with the disclosed method of the present invention, as shown in FIG. 16, the displaying medium 104 may be implemented with transparent materials, such as a slide; paints or inks capable of reflecting lights may be used for printing microdots on the displaying medium 104; and the displaying medium 104 may be attached to the screen 102 implemented with a LCD. Therefore, the disclosed method of the present invention may thus be applied on the touch-triggered LCD. When the held optical scanning device 106 scans the displaying medium 104 attached to the screen 102, locations of microdots on the displaying medium 104 may be substantially perceived by detecting lights reflected by the microdots with the aid of the disclosed method of the present invention. Note that as long as wavelengths of visible lights or invisible lights absorbed by inks or paints for printing the displaying medium and the microdots are not overlapped with or close to each other so that the microdots can be clearly differentiated from the displaying medium while scanning the displaying medium, feasible replacements of both the microdots and the displaying medium or applications related to the feasible replacements should not be limited in embodiments of the present invention. Furthermore, replacing inks or paints printed on the microdots and displaying medium with materials capable of absorbing visible lights or invisible lights of various wavelength domains are allowed in embodiments of the present invention as long as the abovementioned conditions related to respective wavelength domains are reached.

The present invention discloses a method of raising resolution in locating a frame center on a micro dotmap including a plurality of encoding blocks by determining a precise coordinate of the frame center with higher resolution. With the aid of the disclosed method of the present invention, while using the held optical scanning device or using an optical pen to manipulate a touch screen, a user may skillfully manipulate the movement of the frame center displayed by the screen.

Those skilled in the art will readily observe that numerous modifications and alterations of the device and method may be made while retaining the teachings of the invention.

What is claimed is:

1. A method of raising resolution in locating on a micro dotmap, wherein the micro dotmap comprises a plurality of encoding blocks arranged according to a first rule; each of the plurality of encoding blocks comprises a combination of a plurality of microdots to indicate a coordinate of the corresponding encoding block on the micro dotmap; the method comprising:

fetching a frame on the micro dotmap and defining a datum point on the frame;

recognizing one encoding block, at which the datum point is located, on the micro dotmap;

decoding the combination of microdots comprised by the recognized encoding block for determining a coordinate of the recognized encoding block on the micro dotmap; and calculating a coordinate of the datum point on the micro dotmap according to relative conditions between the datum point and each microdot comprised by the recognized encoding block.

2. The method of claim 1 wherein each of the plurality of encoding blocks is separated into a header region and a data region;

wherein calculating the coordinate of the datum point on the micro dotmap according to the relative conditions between the datum point and each the microdot comprised by the recognized encoding block comprises:

calculating the coordinate of the datum point on the micro dotmap according to relative conditions between the datum point and each microdot comprised by the header region of the recognized encoding block.

3. The method of claim 2 wherein fetching the frame on the micro dotmap and defining the datum point on the frame comprises:

assigning a frame center of the frame as the datum point.

4. The method of claim 3 wherein recognizing the encoding block on the micro dotmap comprises:

recognizing the encoding block, at which the datum point is located on the micro dotmap, according to a plurality of microdots comprised by the header region of each of the plurality of encoding blocks.

5. The method of claim 4 wherein the plurality of microdots comprised by the header region comprise a plurality of physical microdots and a plurality of virtual microdots, and the plurality of virtual microdots are not physically printed on a displaying medium, on which the micro dotmap is printed.

6. The method of claim 5 further comprising:

using interpolation for calculating locations of the plurality of virtual microdots comprised by the header region according to locations of the plurality of physical microdots comprised by the header region;

wherein calculating the coordinate of the datum point on the micro dotmap according to the relative conditions between the datum point and each the microdot comprised by the header region of the recognized encoding block comprises:

calculating the coordinate of the datum point on the micro dotmap according to relative positions between the datum point and each of the physical microdots comprised by the header region, and according to relative positions between the datum point and each of the virtual microdots comprised by the header region.

7. The method of claim 4 wherein calculating the coordinate of the datum point on the micro dotmap according to the relative conditions between the datum point and each the microdot comprised by the header region of the recognized encoding block comprises:

calculating the coordinate of the datum point on the micro dotmap according to a distance between the datum point and each microdot comprised by the header region.

8. The method of claim 7
wherein the coordinate of the recognized encoding block on the micro dotmap is a two-dimensional coordinate corresponding to a first coordinate axis and a second coordinate axis on the micro dotmap;
wherein the plurality of microdots comprised by the header region is separated into a first microdot set, which corresponds to a plurality of consecutive one-dimensional coordinates on the first coordinate axis, and a second microdot set, which corresponds to a plurality of consecutive one-dimensional coordinates on the second coordinate axis;
wherein a coordinate of each the microdot comprised by the recognized encoding block is indicated by a two-dimensional coordinate combination, which is generated according to both a one-dimensional coordinate of a microdot of the first microdot set and a one-dimensional coordinate of a microdot of the second microdot set.

9. The method of claim 8 wherein calculating the coordinate of the datum point on the micro dotmap according to the distance between the datum point and each the microdot comprised by the header region comprises:
determining a first microdot according to the distance between the datum point and each the microdot of the first microdot set, wherein the first microdot has a shortest distance from the datum point within the first microdot set;
determining a second microdot according to the distance between the datum point and each the microdot of the second microdot set, wherein the second microdot has a shortest distance from the datum point within the second microdot set; and
representing the coordinate of the datum point with a two-dimensional coordinate combination generated according to both a first one-dimensional coordinate, which is the one-dimensional coordinate of the first microdot on the first coordinate axis, and a second two-dimensional coordinate, which is the one-dimensional coordinate of the second microdot on the second coordinate axis.

10. The method of claim 1 wherein the first rule comprises arranging the plurality of encoding blocks into a matrix.

11. The method of claim 1 wherein the micro dotmap covers a displaying medium.

12. The method of claim 11 wherein the displaying medium is an electronic displaying device; the micro dotmap is printed on a transparent plate with white paints; and the transparent plate is disposed above a displaying panel comprised by the electronic displaying device.

13. The method of claim 11 wherein the micro dotmap is printed on a plate with a type of paint capable of absorbing a type of invisible lights, whose wavelength is not overlapped with a wavelength of a spectrum of lights absorbed by the displaying medium, so that the plurality of microdots on the micro dotmap are detected according to the type of invisible lights while scanning the micro dotmap.

14. The method of claim 11 wherein the micro dotmap is printed on a plate with a type of paint capable of reflecting a type of invisible lights, whose wavelength is not overlapped with a wavelength of a spectrum of lights absorbed by the displaying medium, so that the plurality of microdots on the micro dotmap are detected according to the type of invisible lights while scanning the micro dotmap.

15. A method of raising resolution in locating on a micro dotmap, wherein the micro dotmap comprises a plurality of encoding blocks arranged according to a first rule; each of the plurality of encoding blocks comprises a combination of plurality of microdots to indicate a coordinate of the corresponding encoding block on the micro dotmap; the method comprising:
fetching a frame on the micro dotmap and defining a datum point on the frame;
recognizing one encoding block, at which the datum point is located, on the micro dotmap;
decoding the combination of the plurality of microdots comprised by the recognized encoding block for determining a coordinate of the recognized encoding block on the micro dotmap; and
calculating a coordinate of the datum point on the micro dotmap according to relative conditions between the datum point and an origin of the recognized encoding block.

16. The method of claim 15
wherein each of the plurality of encoding blocks is separated into a header region and a data region;
wherein calculating the coordinate of the datum point on the micro dotmap according to the relative conditions between the datum point and the origin of the recognized encoding block comprises:
calculating the coordinate of the datum point on the micro dotmap and determining the relative conditions between the datum point and the origin of the recognized encoding block according to relative conditions between the datum point and each microdot comprised by the header region of the recognized encoding block.

17. The method of claim 16 wherein fetching the frame on the micro dotmap and defining the datum point on the frame comprises:
assigning a frame center of the frame as the datum point.

18. The method of claim 17 wherein recognizing the encoding block on the micro dotmap comprises:
recognizing the encoding block, at which the datum point is located on the micro dotmap, according to a plurality of microdots comprised by the header region of each of the plurality of encoding blocks.

19. The method of claim 18 wherein the plurality of microdots comprised by the header region comprise a plurality of physical microdots and a plurality of virtual microdots; the plurality of virtual microdots are determined by using interpolation on the plurality of physical microdots; and the plurality of virtual microdots are not physically printed on a displaying medium, on which the micro dotmap is printed.

20. The method of claim 19 further comprising:
using interpolation for calculating locations of the plurality of virtual microdots comprised by the header region according to locations of the plurality of physical microdots comprised by the header region;
wherein calculating the coordinate of the datum point on the micro dotmap and determining the relative conditions between the datum point and the origin of the recognized encoding block according to the relative conditions between the datum point and each the microdot comprised by the header region of the recognized encoding block comprises:
calculating the coordinate of the datum point on the micro dotmap and determining the relative conditions between the datum point and the origin of the recognized encoding block according to relative positions between the datum point and each of the physical microdots comprised by the header region, and according to relative positions between the datum point and each of the virtual microdots comprised by the header region.

21. The method of claim 20 wherein calculating the coordinate of the datum point on the micro dotmap and determining the relative conditions between the datum point and the origin of the recognized encoding block according to the relative conditions between the datum point and each the physical microdot comprised by the header region and according to the relative conditions between the datum point and each the virtual microdot comprised by the header region comprises:
calculating a distance between the datum point and each the physical microdot comprised by the header region and a distance between the datum point and each the virtual microdot comprised by the header region.

22. The method of claim 21
wherein an union set of the plurality of physical microdots and virtual microdots comprised by the header region is separated into a first microdot set, which corresponds to a plurality of consecutive one-dimensional coordinates on a first coordinate axis, and a second microdot set, which corresponds to a plurality of consecutive one-dimensional coordinates on a second coordinate axis, and the origin of the recognized encoding block is a unique intersection between the first microdot set and the second microdot set;
wherein a coordinate of the datum point is indicated by a two-dimensional coordinate combination, which is generated according to both a one-dimensional coordinate of a microdot of the first microdot set and a one-dimensional coordinate of a microdot of the second microdot set.

23. The method of claim 22 wherein calculating the coordinate of the datum point on the micro dotmap and determining the relative conditions between the datum point and the origin of the recognized encoding block according to both the relative conditions between the datum point and each the physical microdot comprised by the header region and the relative conditions between the datum point and each the virtual microdot comprised by the header region comprises:
determining a first microdot according to the distance between the datum point and each the microdot of the first microdot set, wherein the first microdot has a shortest distance from the datum point within the first microdot set;
determining a second microdot according to the distance between the datum point and each the microdot of the second microdot set, wherein the second microdot has a shortest distance from the datum point within the second microdot set; and
representing the coordinate of the datum point with a two-dimensional coordinate combination generated according to both a first one-dimensional coordinate, which is the one-dimensional coordinate of the first microdot on the first coordinate axis, and a second two-dimensional coordinate, which is the one-dimensional coordinate of the second microdot on the second coordinate axis.

24. The method of claim 22 wherein calculating the coordinate of the datum point on the micro dotmap and determining the relative conditions between the datum point and the origin of the recognized encoding block according to the relative conditions between the datum point and each the physical microdot comprised by the header region and according to the relative conditions between the datum point and each the virtual microdot comprised by the header region comprises:
connecting all microdots of the first microdot set with a first line segment;
connecting all microdots of the second microdot set with a second line segment;
determining a third line segment, which stretches from the datum point to the first line segment and has a same slope with the second line segment;
determining a fourth line segment, which stretches from the datum point to the second line segment and has a same slope with the first line segment;
determining a first intersection of the first line segment and the third line segment;
determining a second intersection of the second line segment and the fourth segment;
determining a first distance between the first intersection and the origin of the recognized encoding block, at which the datum point is located;
determining a second distance between the second intersection and the original of the recognized encoding block, at which the datum point is located; and
determining the coordinate of the datum point on the micro dotmap according to the first distance, the second distance, and a two-dimensional coordinate of the origin of the recognized encoding block on the micro dotmap;
wherein the coordinate of the datum point on the micro dotmap is a two-dimensional coordinate.

25. The method of claim 16 wherein each of the plurality of encoding blocks respectively corresponds to a specific coordinate on the micro dotmap.

26. The method of claim 15 wherein the first rule comprises arranging the plurality of encoding blocks into a matrix.

27. The method of claim 15 wherein the micro dotmap covers a displaying medium.

28. The method of claim 27 wherein the displaying medium is an electronic displaying device; the micro dotmap is printed on a transparent plate with white paints; and the transparent plate is disposed above a displaying panel comprised by the electronic displaying device.

29. The method of claim 27 wherein the micro dotmap is printed on a plate with a type of paint capable of absorbing a type of invisible lights, whose wavelength is not overlapped with a wavelength of a spectrum of lights absorbed by the displaying medium, so that the plurality of microdots on the micro dotmap are detected according to the type of invisible lights while scanning the micro dotmap.

30. The method of claim 27 wherein the micro dotmap is printed on a plate with a type of paint capable of reflecting a type of invisible lights, whose wavelength is not overlapped with a wavelength of a spectrum of lights absorbed by the displaying medium, so that the plurality of microdots on the micro dotmap are detected according to the type of invisible lights while scanning the micro dotmap.

* * * * *